United States Patent [19]
Oomen

[11] 3,902,123

[45] Aug. 26, 1975

[54] DIGITAL CIRCUIT FOR DETERMINING IF SIGNAL SOURCE CONSISTS PRIMARILY OF NOISE OR CONTAINS INFORMATION

[75] Inventor: Johannes A. F. Oomen, Rotterdam, Netherlands

[73] Assignee: Cincinnati Electronics Corporation, Cincinnati, Ohio

[22] Filed: Nov. 30, 1973

[21] Appl. No.: 420,544

[52] U.S. Cl. .................. 325/478; 179/1 P; 325/348; 325/403; 325/474

[51] Int. Cl. .................. H04b 1/16

[58] Field of Search ........... 325/478, 492, 348, 402, 325/403, 408, 410, 474; 179/1 P

[56] References Cited

UNITED STATES PATENTS

| | | | |
|---|---|---|---|
| 2,912,571 | 11/1959 | Jacobsen et al. | 325/492 |
| 3,437,937 | 4/1969 | Warfield | 325/478 |
| 3,633,112 | 1/1972 | Anderson | 325/478 |

*Primary Examiner*—Robert L. Griffin
*Assistant Examiner*—Marc E. Bookbinder
*Attorney, Agent, or Firm*—Lowe, King & Price

[57] ABSTRACT

A digital squelch circuit responds to a band limited audio output signal of a radio receiver to count the number of cycles of the source per unit length of time. In response to the count being respectively above and below a predetermined value, the audio signal source is decoupled from and gated to an output terminal. The audio signal source is gated to the output terminal for a predetermined period subsequent to termination of the count with the predetermined time being less than a pre-established value in order to prevent squelching in the period between adjacent words of a voice source.

8 Claims, 5 Drawing Figures

DIGITAL CIRCUIT FOR DETERMINING IF SIGNAL SOURCE CONSISTS PRIMARILY OF NOISE OR CONTAINS INFORMATION

FIELD OF INVENTION

The present invention relates generally to circuits for determining if a band limited audio signal source consists primarily of noise or contains information, and more particularly to such a circuit wherein digital circuitry is provided to count the number of cycles per unit time of the source.

BACKGROUND OF THE INVENTION

Circuits for determining if a band limited audio signal source consists only of noise or contains information, in the form of a voice signal or a tone, are utilized extensively in squelch circuits of radio receivers. In response to an indication of the audio signal source consisting only of noise, the squelch circuit is activated, whereby the audio signal source is decoupled from the output of the radio receiver and a receiver operator is not subject to the annoyance of noise. In response to an audio information signal, such as a voice signal or a tone being received, the squelch circuit must be quickly deenergized so that the information signal can be passed to the radio receiver output. It is generally desirable to maintain the squelch circuit in an inactive state in the interval between words of a voice signal so that the initial portion of a word is not clipped. This is particularly important in single sideband receivers wherein a received signal does not include a carrier.

In the prior art, it has generally been the practice to utilize analog type circuits for activating radio receiver squelch circuits. One form of prior art analog circuit has generally utilized circuitry for detecting relative amplitudes of energy in different bands of the received audio signal. For example, energy in two bands of the receiver audio output signal is detected with a pair of bandpass filters, the outputs of which are amplitude detected and compared to detect the presence of a voice signal. In response to the amplitude of the two filter responses being approximately the same, an indication is provided that only noise is being received and the audio signal is squelched, i.e., decoupled from the receiver output. In response to energy in one of the bands, usually a low frequency band, being significantly greater than the energy in the other band, the audio signal is not squelched, but is passed to the receiver output terminal. Because this prior art squelch circuit utilizes audio bandpass filters, or the like, which require relatively large inductances and capacitances, the squelch circuits occupy a significant amount of space and cannot be implemented with readily available integrated circuit components. Further, there is a significant amount of ambiguity in detecting the relative amplitudes of the energy in different bandpasses, so that the prior art devices generally do not provide both positive and sensitive detection of the presence of voice signals. Also, the prior art circuits frequently do not respond immediately to voice utterances because of the time required to detect energy levels in the two bandpasses of interest.

BRIEF DESCRIPTION OF THE INVENTION

In accordance with the present invention, digital circuitry, which can be implemented by readily available integrated circuit components, is provided to make a determination if a band limited audio signal source consists primarily of noise or contains information in the form of a voice signal or a tone. The digital circuitry counts the number of cycles of the source per unit of length of time by responding to alternate zero crossings of the audio signal source. In response to the number of cycles per unit length of time exceeding a predetermined quantity, an indication is provided that the audio signal source consists primarily of noise; an indication of information being included in the signal source is derived in response to the counted number of cycles per unit length of time being less than the predetermined number. The circuit has particular utility in conjunction with radio receiver squelch circuits to provide a positive and sensitive apparatus for detecting the presence of voice signals utilizing integrated circuit components that occupy a minimum of space and consume a very small amount of power. The power consumption is so small that in certain embodiments of the invention the audio signals can be detected and used to power the integrated circuit components.

The theoretical principle on which the circuit of the present invention is based is explained on page 128 of the book entitled "Principles and Applications of Random Noise Theory" by J. S. Bendat. In Bendat's book, it is shown that the average number of zero crossings of an output signal from an ideal low pass filter having Gaussian noise as its input, can be expressed by:

$$N = 0.58F_c$$

where:

$N$ = average number of cycles per second of the filter output; and $F_c$ = the cutoff frequency of the low pass filter.

For a 3 KHz narrow band voice radio channel, such as is provided by the output of a radio receiver, the average number of cycles per second of the filter output for Gaussian noise input thereby equals 1740 per second, i.e., a 0–3 KHz Gaussian noise source fed to a low pass filter having a 3 KHz cutoff frequency is passed through the filter with an average frequency of 1740 Hertz. Experiments show that with voice signals present on the 3 KHz radio channel, the number of zero crossings drops significantly below 1740 per second. The present invention relies upon this experimental finding to signal the presence of information, in the form of a voice signal or tone, or the absence of information, in the form of noise, in a band limited audio signal source. To enable the presence of an information signal to be determined in a relatively short time interval, in a sensitive and positive way, the number of cycles is determined in a preferred embodiment approximately every 50 milliseconds. As a further feature of the invention, a gate responsive to detection of a voice signal is maintained in an open condition for a period equal to the average time interval between words of a typical speaker; such an interval is approximately one second. Thereby, clipping of the beginning portions of words is positively precluded in most instances.

It is, accordingly, an object of the present invention to provide a new and improved circuit for determining if a band limited audio signal source consists primarily of noise or contains information, in the form of a voice signal or a tone.

Another object of the present invention is to provide a new and improved squelch circuit for a band limited audio signal derived from a radio receiver.

Another object of the invention is to provide a new and improved sqelch circuit for a radio receiver wherein detection of the presence of an information signal, to the exclusion of noise, is positively provided with relatively great sensitivity.

An additional object of the present invention is to provide a digital squelch circuit which can be implemented utilizing readily available low power consuming integrated circuit components that can be packaged in a small volume.

A further object of the present invention is to provide a new and improved radio receiver squelch circuit which is activated a relatively short time interval after the occurrence of a received band limited voice signal.

Still another object of the invention is to provide a new and improved radio receiver squelch circuit wherein the squelch circuit is not activated in the normal interval between word utterances of a voice signal.

The above and still further objects, features and advantages of the present invention will become apparent upon consideration of the following detailed description of several specific embodiments thereof, especially when taken in conjunction with the accompanying drawing.

DETAILED DESCRIPTION OF THE DRAWING

Figure 1:
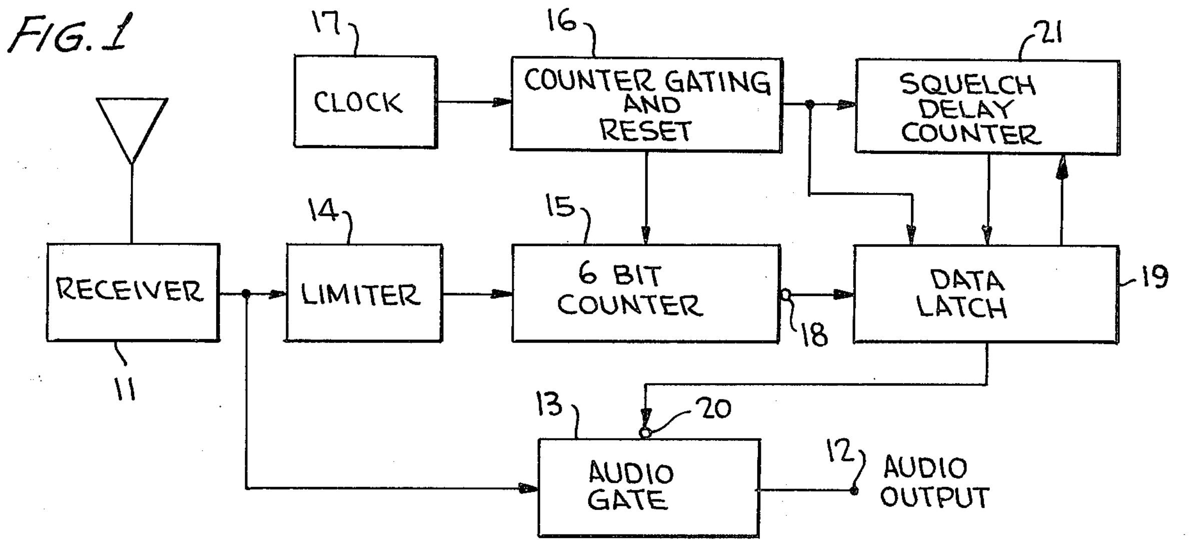
FIG. 1 is a block diagram of the invention.

Reference is now made to FIG. 1 of the drawing wherein there is illustrated a radio receiver 11, which can be responsive to an amplitude modulated radio wave that includes a carrier and both sidebands or a single sideband wave, or an f.m. wave. Radio receiver 11, in a typical configuration, derives a band limited audio signal having a bandpass of approximately 3 KHz. The audio output of receiver 11 can be an information signal that contains voice information or tones, such as is derived in response to frequency shift key or phase shift key telegraphy transmission. If no signal is derived from receiver 11, the output thereof consists only of Gaussian noise over the 3 KHz band. The output of receiver 11 is selectively fed to audio output terminal 12, which may be connected to an aural indicator such as a head set, through audio gate 13. Audio gate 13 is controlled by digital circuitry which determines if the output of receiver 11 contains information or consists only of noise and thereby provides squelch control.

The digital circuitry basically includes means for counting the number of cycles, i.e., alternate zero crossings, of the audio output of receiver 11 per unit length of time. To these ends, the output of receiver 11 is fed to limiter 14, which derives a short duration pulse in response to every positive going zero crossing of the receiver output. The output signal of limiter 14 is fed to the advance input of binary counter 15, which typically is a seven-bit binary counter or frequency divider arranged to derive an output pulse in response to eighty pulses being supplied to its input. Counter 15 is periodically reset, generally once every 50 milliseconds, i.e., at a frequency of 20 Hz, in response to a reset pulse being applied thereto by counter, gating and reset network 16, having a clock input responsive to a relatively constant frequency clock source 17. In a typical embodiment, clock source 17 derives a 320 Hertz output signal that is frequency divided by a factor of 16 in four-stage binary counter 16 which thereby derives a pulse once every 50 milliseconds to reset counter 15.

Audio gate 13 responds to the output of counter 15 to decouple the audio output of receiver 11 from terminal 12 in response to the audio output consisting only of noise, as indicated by the count of counter 15 exceeding 80 in the 50 millisecond period between resetting. Audio gate 13 is open to pass the output of receiver 11 to audio output terminal 12 in response to the count of counter 15 being equal to or less than 80 in the 50 millisecond period between resets. To these ends, counter 15 includes an overflow output terminal that is normally connected through data latch circuit 19 to an enable input 20 of audio gate 13. Hence, counter 15 derives an output signal to indicate whether the signal from receiver 11 contains frequencies above or below a 1600 Hertz cutoff frequency during a 50 millisecond sampling period. While the 1600 Hertz cutoff indication derived from the output of counter 15 does not coincide with the theoretical average frequency of 1750 Hertz previously mentioned, the 8 percent deviation is adequate for practical purposes. Data latch circuit 19 is responsive to output pulses of counter, gating and reset circuit 16; the pulses are derived with the same periodicity as the reset input of counter 15, but with a phase displacement relative thereto so that the data latch circuit 19 is enabled one pulse prior to resetting of counter 15. Thereby, resetting of counter 15 and enabling of data latch circuit 19 do not occur simultaneously and the likelihood of false triggering of an enable circuit of data latch 19 is materially reduced.

To enable audio gate 13 to remain open in the approximately one second interval generally occurring between adjacent words of a voice signal, squelch delay counter 21 is provided. Counter 21 is a four-stage counter having a count input derived in synchronism with the pulses fed by counter, gating and reset network 16 to data latch 19. Four-stage binary counter 21 frequency divides its input by a factor of 16, and thereby derives an output pulse which is fed to data latch circuit 19 approximately once every 0.8 seconds. Once data latch 19 is activated so that it supplies an enabling voltage to terminal 20 of audio gate 13 to maintain the gate in an open state to pass the outoutput of receiver 11 to terminal 12, the data latch is maintained in the open state until a pulse is supplied to the data latch by counter 21. Thereby, audio gate 13 is maintained in an open condition in the interval between adjacent words of a voice signal. To prevent data latch circuit 19 from being activated by counter 21 while a voice signal is being derived from receiver 11 and no overflow is generated at output terminal 18 of counter 15, squelch delay counter 21 is reset by a pulse supplied thereto by the data latch circuit 19.

Figure 2:
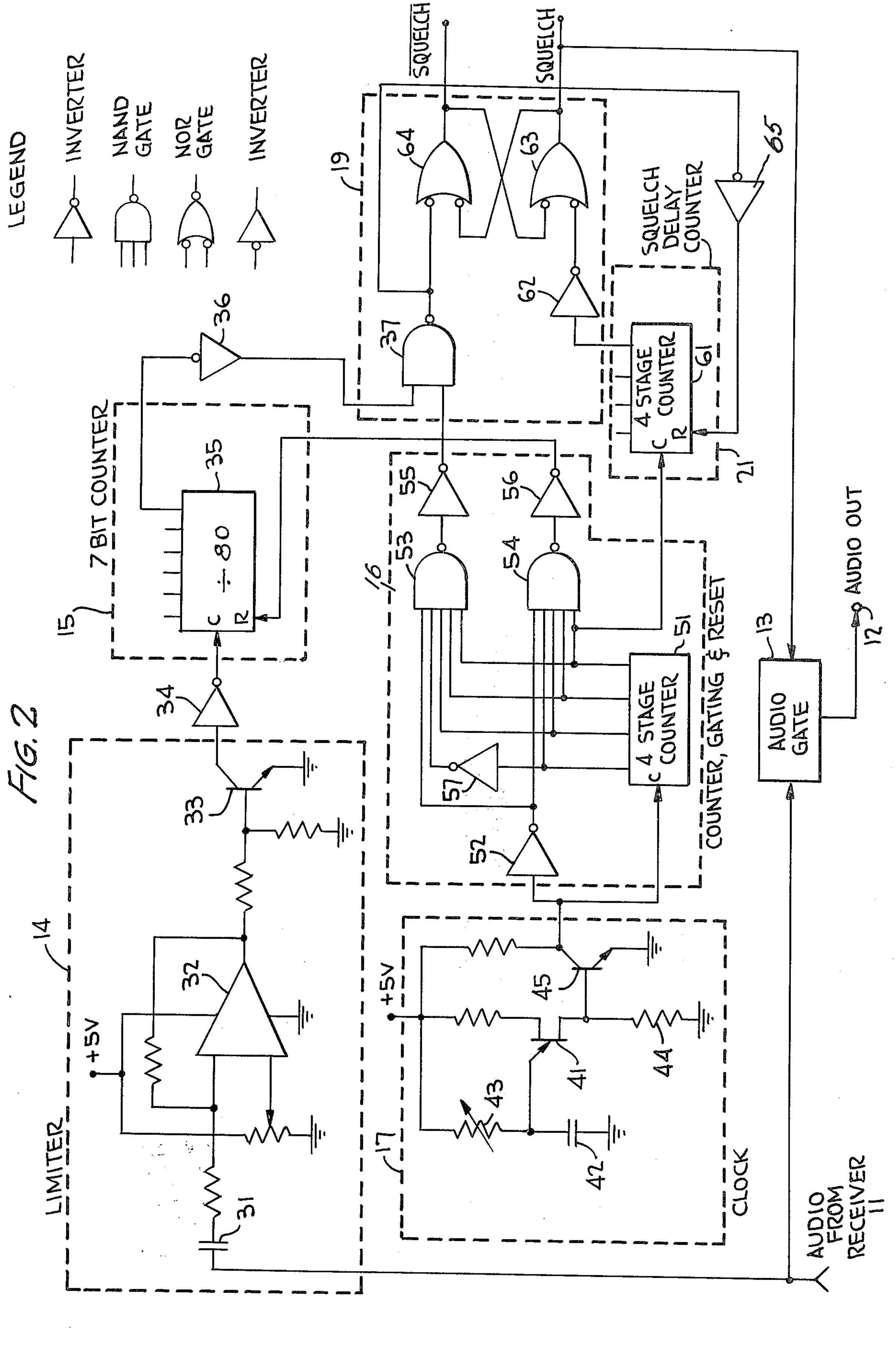

Reference is now made to FIG. 2 of the drawing wherein there is illustrated a circuit diagram, utilizing transistor logic (TTL) networks, of the squelch portion of the circuitry illustrated in FIG. 1. The audio output signal of receiver 11 is fed through a.c. coupling capacitor 31 to high gain integrated circuit operational amplifier 32, which provides between 30 and 60 db of gain for its input signal and thereby functions as limiter 14. For virtually all gain settings of the receiver, amplifier 32 is thereby saturated in response to each half cycle of its audio input and the amplifier output signal consists of square waves having leading and trailing edges in substantial time coincidence with the positive and negative going zero crossings of the audio signal. The output of amplifier 32 is supplied to the base of common emitter NPN transistor 33, the collector of which is connected to inverter 34.

The output signal of inverter 34 is coupled to a clock input of integrated circuit seven-bit binary counter 35, which comprises counter 15, FIG. 1. Counter 35 responds solely to the positive going transitions of the output of inverter 34, and thereby is advanced by a count of one in response to each positive going zero crossing of the audio input. The last stage of counter 35 is connected through inverter 36 to one input of NAND gate 37, whereby gate 37 is responsive to counter 35 being driven to overflow at a count of 64. Since the audio input to limiter 14 is band limited to an upper frequency of 3 KHz, counter 35 is activated so that once its most significant bit stage is in a binary one state, the most significant bit stage remains in a binary one state until the counter is reset by the 20 Hertz pulse applied to the counter reset input terminal from counter, gating, and reset circuit 16. The reset input of counter 35 and the other input of NAND gate 37 are derived by counter, gating, and reset network 16, which is in turn responsive to the output of clock pulse source 17.

Clock pulse 17 preferably comprises a relaxation oscillator including a unijunction transistor 41 having a control electrode connected to a terminal between capacitor 42 and variable resistor 43. The value of resistor 43 is variable to control the frequency of clock 17 and hence sensitivity of the squelch circuit. The sensitivity of the squelch circuit is respectively increased and decreased by increasing and decreasing the frequency of clock oscillator 17 through the control provided by resistor 43. Pulses developed across base resistor 44 of unijunction transistor 41 are coupled to the base of grounded emitter NPN transistor 45, the collector of which is connected to supply pulses in parallel to a count input of four-stage binary counter 51 and inverter 52, which are included in circuit 16. The outputs of inverter 52 and the four stages of counter 51 are connected to NAND gates 53 and 54, having outputs which are respectively fed via inverters 55 and 56 to NAND gate 37 and the reset input of counter 35. The four output stages of counter 51 are connected directly to the inputs of NAND gate 54 which drives inverter 56 that thereby derives a a pulse output in response to the counter having a count of 15. The three most significant bit output stages of counter 51 are connected directly to NAND gate 53 while the least significant bit output stage of counter 51 is fed via inverter 57 to NAND gate 53 which drives inverter 55 so that the inverter derives a pulse while counter 51 is set to a count of 14. Thereby, inverters 55 and 56 derive pulses having identical frequencies, but phase displaced 1/16th of a cycle from each other, with the pulse derived from inverter 55 occurring immediately prior to the pulse derived from inverter 56.

Counter, gating and reset network 16 includes a further output, derived from the most significant bit stage of counter 51, that is coupled to a clock input of four-stage binary counter 61 that comprises squelch delay counter 21. The clock input of counter 61 responds to the trailing edge of the output of counter 51. Thereby, counter 61 is advanced by a count of one every 50 milliseconds, assuming 320 Hertz for the frequency of clock 17. The most significant bit stage of counter 61 thereby derives a pulse 0.4 seconds subsequent to the least significant bit stage of counter 51 deriving its first output pulse.

The output pulse of the most significant bit stage of counter 61 is fed through inverter 62 to one input terminal of NOR gate 63, which is connected in a regenerative manner to NOR gate 64 to form a flip-flop circuit. NOR gate 64 is responsive to the low-level output of NAND gate 37, which is fed in parallel to the reset input of counter 61. In response to NOR gate 64 deriving a positive voltage level, an indication is provided that a voice signal is being received or that a pause of less than 0.4 second between adjacent words of a voice signal is occurring, whereby audio gate 13 is activated so that it passes the audio input fed thereto to output terminal 12.

To more positively describe the operation of the circuit, a number of examples will be considered. Initially, assume that a voice signal is being received and that counters 35 and 51 are both storing counts of zero. Next assume that fourteen pulses have been derived from clock 17, whereby a binary one enabling signal is supplied by inverter 55 to one of the inputs of NAND gate 37. Since a voice signal is being received, counter 35 is activated so that a binary zero signal is derived from its output. The binary zero at the output of counter 35 is inverted by inverter 36 and fed through enabled NAND gate 37 as a binary zero level to activate the flip-flop comprising NOR gates 63 and 64 so that NOR gate 63 derives a binary zero level. The binary zero level derived by NOR gate 63 is fed to an enable input of audio gate 13 so that the audio input signal is fed to output terminal 12. In response to the fifteenth pulse from clock 17, counter 51 is advanced so that a binary one reset signal is supplied by inverter 56 to reset counter 35 to a zero state.

Next, assume that a pause of less than 0.4 seconds occurs between adjacent words of a voice signal and that counters 35 and 51 are in the zero state. In response to 14 pulses having been derived from clock 17, NAND gate 37 is again enabled by the output of inverter 55. The other input to NAND gate 37 at this time, however, has a binary zero level since counter 35 is now being driven by the audio input signal at a high enough rate to cause a binary one to be derived from its output. The binary one output signal of NAND gate 37 has no effect on the flip-flop comprising NOR gates 63 and 64 and prevents resetting of four-stage counter 61. Thereby, audio gate 13 remains in an open state and counter 61 continues to be advanced by subsequent 20 Hertz output signals from the most significant bit stage of counter 51. The most significant bit stage of counter 61 remains in a binary zero state throughout the interval being considered because the interval is less than 0.4 seconds. Counter 61 is reset in response to a binary one signal subsequently derived from inverter 65, which in turn is driven by a binary zero output level from NAND gate 37 prior to the most significant bit stage of the counter being activated to a binary one state.

However, if it is now assumed that a noise signal is received for in excess of 0.4 seconds, eight successive input pulses are supplied to the clock input terminal of counter 61 without the counter being reset, whereby a binary one signal is loaded in the most significant bit stage of the counter. The binary one signal in the most significant bit stage of counter 61 is fed via inverter 62 to NOR gate 63, to activate the flip-flop so that a binary one level is derived from NOR gate 63. The binary one from NOR gate 63 closes gate 13 to squelch the audio input to the gate so it does not reach output terminal 12.

Figure 3:
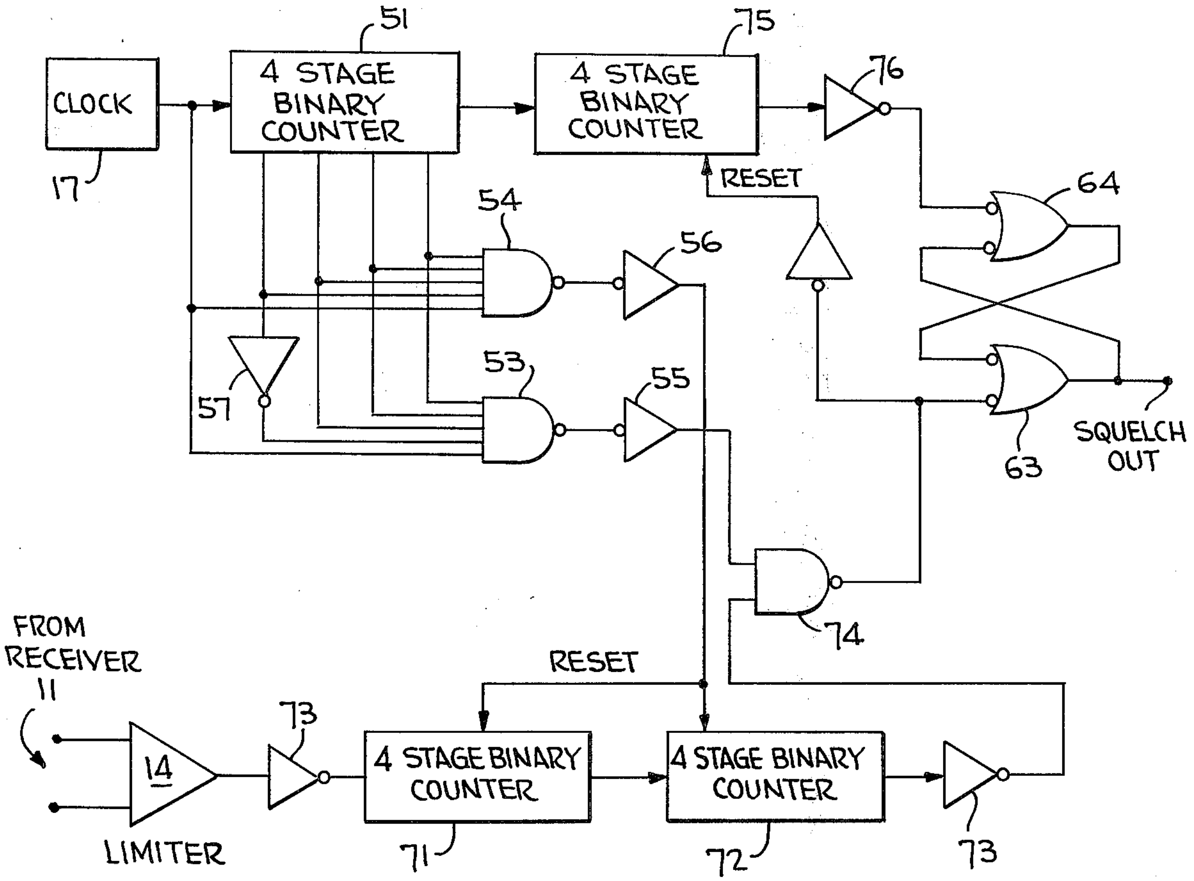
FIGS. 2–5 are circuit diagrams of different embodiments of the invention.

Reference is now made to a further embodiment of the invention, as illustrated in FIG. 3, wherein the control circuitry is illustrated as including a limiter amplifier 14 that drives cascaded divide by sixteen frequency dividers 71 and 72, via inverter 73. Each of frequency dividers 71 and 72 comprises a four-stage binary counter having a reset input terminal driven in parallel by pulses derived from a further frequency divider driven by clock source 17. The further frequency divider comprises four-stage binary counter 51 which is connected to NAND gate 54 and inverter 56 in the same manner as described supra with regard to FIG. 2. Pulses derived from inverter 56 are applied in parallel to the reset input terminals of counters 71 and 72, whereby counters 71 and 72 are reset to a count of zero in response to counter 51 having a count of 15. The most significant bit output of counter 72 is fed through inverter 73 as an enable input to NAND gate 74, the other input of which is enabled in response to counter 51 having a count of fourteen. The count of 14 indication for counter 51 is derived by utilizing inverter 57, NAND gate 53 and inverter 55 in the same manner as described with regard to FIG. 2. The output of NAND gate 74 is fed in parallel to a flip-flop NOR gate 63 and via inverter 78 to a reset input of four-stage, binary counter 75 having a shift input cascaded with the most significant bit stage of counter 51. Thereby, counter 75 is advanced by a count of one each time counter 51 is driven from a count of 15 back to a count of zero. The most significant bit stage of counter 75 is fed through inverter 76 to one input of NOR gate 64, which is connected to NOR gate 63 as a regenerative flip-flop. NOR gate 63 is also responsive to the output of NAND gate 74, whereby NOR gate 63 derives a binary zero signal to control audio gate 13 in the manner described with regard to FIG. 2.

It is thereby seen that there are only slight differences in the circuits of FIGS. 2 and 3, with regard to resetting of the squelch delay counter and the logic circuit connections between the squelch delay counter and the flip-flop circuit, as well as between the flip-flop circuit and frequency divider circuitry responsive to the audio output signal of the receiver.

Figure 4:
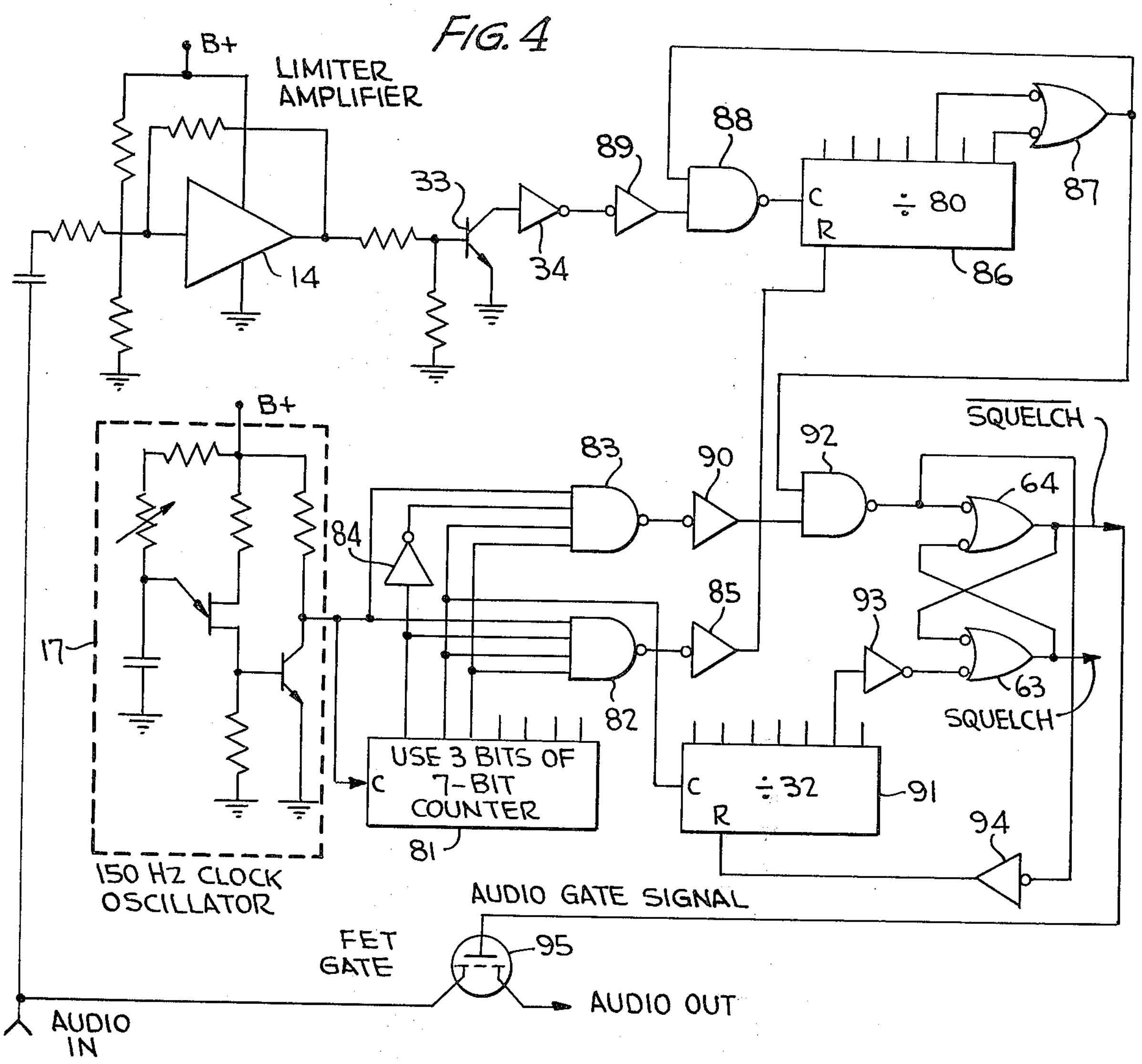

Reference is now made to FIG. 4 of the drawing wherein there is illustrated an alternate version of the present invention utilizing a clock oscillator having a lower frequency than that employed in FIGS. 2 and 3, as well as available seven-stage complementary metal oxide semiconductor counters. In particular, clock oscillator 17 includes a unijunction transistor oscillator 17 having a frequency of approximately 150 Hertz. Oscillator 17 is fed to a clock input of seven-bit binary counter 81, which is interconnected so that it recycles back to a count of zero after having reached a maximum count of seven. Counter 81 thereby functions as a divide by eight frequency divider to generate an output signal having a frequency of 18.75 Hertz. The output signal of oscillator 17 is combined with binary signals from the three least significant bit stages of counter 81 in NAND gate 82 which thereby derives a pulse in response to the counter having a count of seven. NAND gate 83 is connected to the least three significant stages of counter 81 and the output of oscillator 17 so that a pulse is derived from the NAND gate in response to the counter having a count of six. To these ends, the two most significant bit stages of counter 81 are directly connected to NAND gate 83, while the least significant bit stage of the counter is connected through inverter 84 to NAND gate 83.

The output signal of NAND gate 82 is fed through inverter 85 to a reset input of a seven-stage binary counter 86. The fifth and seventh stages of counter 86 are connected as inputs to NOR gate 87, having an output which is fed back to a clock input of counter 86 via NAND gate 88. Thereby counter 86 is connected to have a maximum count of 80 and provides a frequency division of input signals to its clock input terminal of 80. The clock input terminal of counter 86 is also responsive to 1 pulse per cycle of the audio source, as derived from limiter 14 and coupled through transistor 33, inverters 34 and 89 and NAND gate 88. In response to the audio input signal consisting only of noise, counter 86 achieves a count of 80 prior to being reset and a binary zero signal is derived from NOR gate 87. The binary zero signal is combined with an enable output of NAND gate 83, as coupled to NAND gate 89 via inverter 90. In response to an overflow condition of counter 86, as detected by a binary zero output of NOR gate 87, gate 89 remains at a binary one level while counter 81 has a count of six to indicate that the audio signal consists only of noise.

A binary zero output of NAND gate 92 is applied through inverter 94 to a reset input of seven-stage binary counter 91, having a clock input responsive to the second least significant bit stage of counter 81. The penultimate stage of counter 91 is connected to inverter 93, whereby the inverter derives an output pulse in response to every 32 clock pulses supplied to counter 91, unless a reset input is supplied to the counter.

NAND gate 89 and inverter 93 respectively feed input signals to NOR gates 64 and 63 which are interconnected with each other to comprise a flip-flop as described supra. An output binary one of NOR gate 64 is applied to a gate electrode of field effect transistor 95, having source and drain electrodes respectively connected to the audio output terminal of receiver 11 and output terminal 12. The circuitry of FIG. 4 utilizes existing complementary metal oxide semiconductor integrated circuit modules interconnected in hybrid microcircuit form.

In the embodiments of FIGS. 1–4, power for the various circuits is preferably provided from an existing power supply of the radio receiver. In certain applications, however, it may be difficult to tap into the existing power supply to energize the circuit of the present invention. Because the integrated circuit components operate at such low power levels, it is possible to utilize the audio frequency energy derived from receiver 11 as the source of power for the circuits of the present invention.

Figure 5:
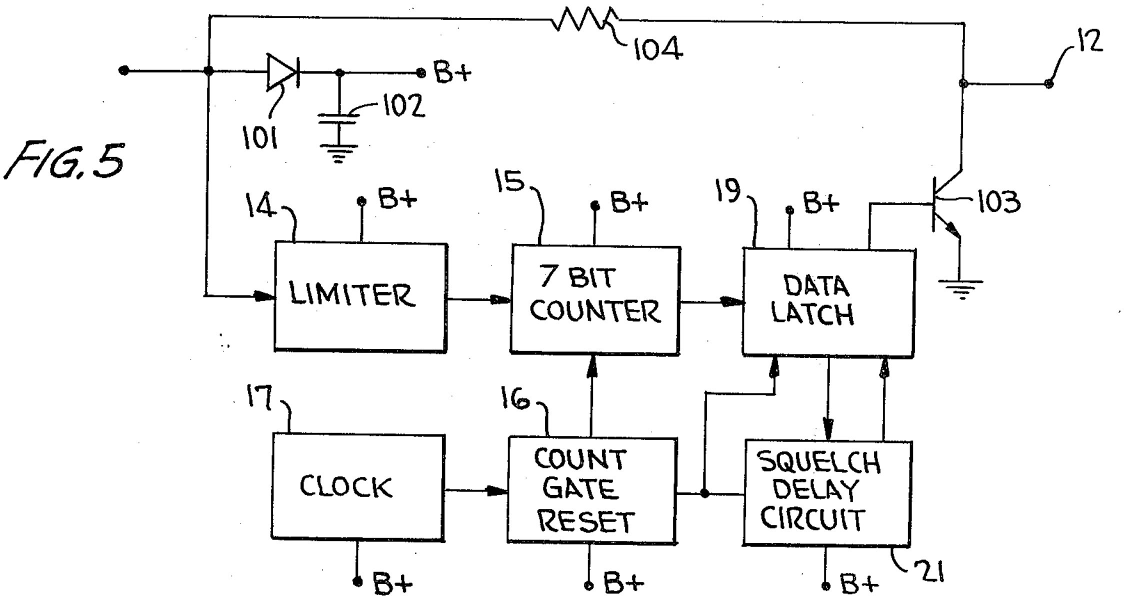

To this end, a self-powered squelch circuit as illustrated in FIG. 5 can be employed. In FIG. 5, the audio output of receiver 11 is supplied to a half wave rectifier comprising series diode 101 and shunt capacitor 102, across which is derived a power supply voltage for the remainder of the squelch circuit. The audio signal is also supplied in parallel to the collector of NPN switching transistor 103 via resistor 104. Transistor 103 is connected in the common emitter mode, with its collector connected to audio output terminal 12, whereby the transistor functions as a shunt switch in response to output signals of the squelch control circuitry comprising limiter 14, six-bit counter 15, counter, gate and reset network 16, clock 17, data latch circuit 19 and squelch delay counter 21. All of the elements of the squelch circuit include power supply terminals responsive to the d.c. voltage developed across capacitor 102. Data latch circuit 19 includes an output terminal to forward bias the emitter collector path of transistor 103 so that the audio source is decoupled from terminal 12 when only noise is being received.

The circuit of the present invention has been built and performed extremely well in response to a voice signal and noise from a white noise generator being supplied to the circuit through a low pass filter having a 3 KHz cutoff frequency. To provide a quantitative measurement of the performance of the circuit, a pure sine wave was mixed with noise from the white noise generator. It was found that the squelch circuit of the invention was capable of recognizing the sine wave at a level of −1 db below the noise level, provided the frequency of the tone was maintained less than 1.7 KHz.

It is to be understood that the principles of the invention can be utilized to detect an information signal in a noise background for applications other than squelch circuits. Further, the information signal may be an audio frequency tone, as well as a voice signal. If the information signal is a tone, the counter responsive to zero crossings could be arranged to overflow unless a specific audio frequency tone of interest is received. Sensitivity of the circuit can be modified either by altering the frequency of clock source 17, as indicated supra, or by providing selectable taps for counter 15, whereby the counter overflows when it is provided with selected counts.

While there has been described and illustrated several specific embodiments of the invention, it will be clear that variations in the details of the embodiments specifically illustrated and described may be made without departing from the true spirit and scope of the invention as defined in the appended claims.

I claim:

1. A digital squelch circuit responsive to a band limited audio output signal of a radio receiver comprising first counter means advanced in response to the signal to repeatedly count the number of cycles of the source in successive time periods having predetermined durations and for deriving an output signal each time the count in one of the periods exceeds a predetermined value indicative of no information signal being derived from the receiver, second counter means advanced once each of the time periods, means for resetting the second counter means each time no signal is derived from the first counter means during a time period, the second counter means deriving an output signal in response to a predetermined number of the time periods occurring prior to resetting of the second counter means, the time interval of the predetermined number of periods being slightly greater than the typical time interval between word utterances of a speaker, a latching circuit respectively driven to first and second states in response to (a) no signal being derived from the first counter means during a time interval and (b) the output signal of the second counter means, and a gate circuit responsive to the receiver output signal and an output signal of the latching circuit for respectively enabling and disabling coupling of the receiver output signal to an output terminal in response to the latching circuit being in the first and second states.

2. The circuit of claim 1 further including means for deriving first, second and third time displaced pulses during each period, said first pulse occurring in each period slightly before the second pulse, the latching circuit and the second counter resetting means being responsive to the sampled output of the first counter means, means for resetting the first counter means in response to the second pulse, and means for advancing the second counter means in response to the third pulse.

3. The circuit of claim 2 wherein the means for deriving the first, second and third time displaced pulses includes a clock source for advancing a third counter means, said third counter means including first, second and third output terminals on which are respectively derived the first, second and third output pulses.

4. The circuit of claim 1 further including rectifier means responsive to the signal for deriving a d.c. power supply voltage for energizing active elements of the squelch circuit.

5. A circuit to indicate if a band limited audio signal contains information, in the form of a voice signal or a tone, or consists primarily of noise, comprising first counter means advanced in response to the signal to repeatedly count the number of cycles of the source in successive time periods having predetermined durations and for deriving an output signal each time the count in one of the periods exceeds a predetermined value indicative of no information signal being derived from the receiver, second counter means advanced once each of the time periods, means for resetting the second counter means each time no signal is derived from the first counter means during a time period, the second counter means deriving an output signal in response to a predetermined number of the time periods occurring prior to resetting of the second counter means, the time interval of the predetermined number of periods being slightly greater than the typical time interval between word utterances of a speaker, a latching circuit respectively driven to first and second states in response to (a) no signal being derived from the first counter means during a time period and (b) the output signal of the second counter means, the latching circuit being in the first and second states respectively indicating that the audio signal does and does not contain the information.

6. The circuit of claim 5 further including means for deriving first, second and third time displaced pulses during each period, said first pulse occurring in each period slightly before the second pulse, the latching circuit and the second counter resetting means being responsive to the sampled output of the first counter means, means for resetting the first counter means in response to the second pulse, and means for advancing the second counter means in response to the third pulse.

7. The circuit of claim 6 wherein the means for deriving the first, second and third time displaced pulses includes a clock source for advancing a third counter means, said third counter means including first, second and third output terminals on which are respectively derived the first, second and third output pulses.

8. A circuit to indicate if a band limited audio signal contains information, in the form of a voice signal or a tone, or consists primarily of noise, comprising first counter means advanced in response to the signal to repeatedly count the number of cycles of the source in successive time periods having predetermined durations and for deriving an output signal each time the count in one of the periods exceeds a predetermined value indicative of no information signal being derived from the receiver, a clock source, second counter means advanced in response to the clock source, means for resetting the second counter means each time no signal is derived from the first counter means during a time period, the second counter means deriving an output signal in response to a predetermined number of the time periods occurring prior to resetting of the second counter means, the time interval of the predetermined number of periods being slightly greater than the typical time interval between word utterances of a speaker, a latching circuit respectively driven to first and second states in response to (a) no signal being derived from the first counter means during a time period and (b) the output signal of the second counter means, the latching circuit being in the first and second states respectively indicating that the audio signal does and does not contain the information.

* * * * *